(12) United States Patent
Dong

(10) Patent No.: US 11,130,565 B1
(45) Date of Patent: *Sep. 28, 2021

(54) ELECTRIC TORQUE ARM HELICOPTER WITH AUTOROTATION SAFETY LANDING SYSTEM

(71) Applicant: Dawei Dong, French Camp, CA (US)

(72) Inventor: Dawei Dong, French Camp, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/230,019

(22) Filed: Apr. 14, 2021

Related U.S. Application Data

(63) Continuation of application No. 16/831,053, filed on Mar. 26, 2020, which is a continuation-in-part of application No. 16/525,429, filed on Jul. 29, 2019, now Pat. No. 10,604,241, which is a continuation-in-part of application No. 16/180,004, filed on Nov. 4, 2018, now Pat. No. 10,723,449.

(60) Provisional application No. 62/750,462, filed on Oct. 25, 2018.

(51) Int. Cl.
*B64C 27/16* (2006.01)
*B60L 50/60* (2019.01)
*B64C 27/00* (2006.01)
*B64D 27/24* (2006.01)
*B60L 50/52* (2019.01)

(52) U.S. Cl.
CPC .............. *B64C 27/16* (2013.01); *B60L 50/66* (2019.02); *B64C 27/006* (2013.01); *B64D 27/24* (2013.01); *B60L 50/52* (2019.02); *B60L 2200/10* (2013.01)

(58) Field of Classification Search
CPC ....... B64C 27/025; B64C 27/24; B64C 27/16; B64C 27/18; B64C 27/006; B60L 50/52; B60L 50/66; B60L 2200/10
See application file for complete search history.

(56) References Cited

U.S. PATENT DOCUMENTS

| | | | | |
|---|---|---|---|---|
| 1,408,899 A | * | 3/1922 | Marple | B64C 27/16 244/6 |
| 1,568,765 A | * | 1/1926 | Ortego | B64C 27/16 244/17.19 |
| 1,955,921 A | * | 4/1934 | Kusse | B64C 27/16 416/99 |
| 2,490,361 A | * | 12/1949 | Kusse | B64C 27/16 416/99 |
| 2,696,267 A | * | 12/1954 | Mouravieff | B64C 27/18 416/22 |
| 2,771,255 A | * | 11/1956 | Young | B64C 27/16 244/17.27 |

(Continued)

*Primary Examiner* — Marc Burgess
(74) *Attorney, Agent, or Firm* — Keith Kline; The Kline Law Firm PC

(57) ABSTRACT

A battery powered helicopter uses one or more torque arms as the power source directly driving the main rotor blades, causing them to rotate. The helicopter does not require a combustion engine, a clutch, a reducer, a tail driver, a tail boom, a tail rotor, or a fuel supply system. The output shaft of the high-energy motor is coaxial with the main rotor shaft. The centrifugal force of one or more motor(s) is negligible or minimized. The torque arm assembly includes a plurality of torque arms. Each of the torque arms of the plurality of torque arms includes a propeller and a driving system. The torque arm propellers are hinged so that they can move between a first closed position and a second open position to institute an autorotation safety system.

9 Claims, 8 Drawing Sheets

(56) References Cited

U.S. PATENT DOCUMENTS

| | | | | |
|---|---|---|---|---|
| 3,482,803 | A * | 12/1969 | Lindenbaum | B64C 27/18 244/17.11 |
| 5,085,315 | A * | 2/1992 | Sambell | B64C 27/30 244/17.25 |
| 7,871,032 | B2 * | 1/2011 | Zhao | B64C 27/16 244/6 |
| 2018/0208296 | A1 * | 7/2018 | Mores | B64C 27/08 |

* cited by examiner

ELECTRIC TORQUE ARM HELICOPTER WITH AUTOROTATION SAFETY LANDING SYSTEM

CROSS-REFERENCE TO RELATED APPLICATIONS

This patent application is a continuation of and claims the priority benefit of U.S. patent application Ser. No. 16/831,053, filed Mar. 26, 2020, now abandoned; which was a continuation-in-part of U.S. patent application Ser. No. 16/525,429, filed Jul. 29, 2019, now issued as U.S. Pat. No. 10,604,241, issued Mar. 31, 2020; that application being a continuation-in-part and claiming the priority benefit of U.S. patent application Ser. No. 16/180,004, filed Nov. 4, 2018; which in turn claims the priority benefit of provisional patent application 62/750,462, filed Oct. 25, 2018. These references are incorporated by reference herein in their entireties.

FIELD OF THE INVENTION

The present invention relates generally to helicopters, and more particularly to a helicopter using a torque arm assembly as a power source to drive a main rotor assembly.

BACKGROUND

Currently, the internationally promoted electric helicopters are mostly multi-rotor structures. It has been developed from the structure of multi-rotor drones in recent years. For example, the multi-rotor air taxis, the jets in the movie Iron Man and the trapeze. Those aircrafts are unlikely to obtain the flight management department's flight permit because they (even with installed parachutes) do not meet safe landing requirement in the event of a failure of the power system. Those helicopters are not equipped with autorotation landing functions.

An ideal (desirable flying), electric helicopter is made possible because of high energy motors and highly efficient batteries. The helicopter of the present disclosure uses a torque arm assembly with propellers generating power to drive a main rotor assembly.

A traditional helicopter relies on an engine's output energy to rotate a main rotor assembly. The main rotor assembly generates lifting force so that the helicopter takes off. A traditional power drive mode is that the power of an internal combustion engine, a turboshaft engine or an electric motor is decelerated by a gearbox. The torque is increased to drive a large-size main rotor assembly.

For a traditional helicopter, while the main rotor assembly is rotating, the entire fuselage also produces a reaction torque with equivalent magnitude. Therefore, the engine and the fuselage will experience the same torque as the main rotor assembly. A tail rotor with long tail boom system is used to balance this torque. A long tail boom system balances the fuselage so that it maintains the direction of the fuselage and the fuselage does not rotate due to the torque of the main rotor assembly. It is conceivable that the transmission system, the balanced torque tail rotor and the long tail boom system not only consume nearly 20% of the power, but also increase the manufacturing difficulties and control issues. The increased control issues may cause accidents.

Another traditional way to drive the main rotor assembly is that the jet engine mounted at the tip of the main rotor assembly produces thrust force to drive the main rotor assembly to rotate. In this way, there is no torque on the fuselage and no longer needs the tail rotor tail boom and a driving system. But it encounters a new issue. When the main rotor assembly is under rotation, the weight of the engine installed at the tip of the rotor generates huge centrifugal force. The jet output direction of the jet engine will constantly change following the change of the blade angle of the rotor blade. The fuel and control transmit through the center shaft. The rotary shaft is output to the tip of the rotor blade that rotates at a high speed.

Up to now, there are many test models, but there are very few practical models entering the commercial market. An important feature of the present disclosure is that the output shaft of the driving motor aligns with an axis of the main rotor shaft so that the centrifugal force of the driving motor is negligible (almost zero). A timing belt with a center distance of approximately 1 meter drives the tip of the propeller from inside the torque arm to push or pull the main rotor to rotate. The timing belt and the push or pull propellers weigh less than one pound and the centrifugal force is small. The torque is calculated by the thrust force (pulling or pushing the propeller) multiplying the torque arm radius of approximate one meter giving the power torque required for the main rotor in the unit of kg-meter or N-M. Motor power is delivered from the central shaft to the motor. It increases the drive efficiency by 35%. If without tail rotor and drive train, the helicopter's mechanical structure has been simplified by 40%. The driving method of the present disclosure is especially suitable for light and small helicopters. The main rotor of the helicopter is rotated by pushing and pulling of an electric propeller mounted on the tip of the torque arm. Helicopters include torque arm driving system. Applicant's issued U.S. Pat. No. 10,076,763 discloses half-flight and half-walk propeller lift suspension boom truss module system. A new driving method may be applied to a helicopter that uses an electric propeller torque arm as the power to drive the main rotor.

SUMMARY OF THE INVENTION

A helicopter comprises a fuselage, a landing gear assembly, a tail assembly including a directional control rudder assembly, a control system assembly, a main shaft assembly, a main rotor assembly, a motor assembly and a torque arm assembly. The main rotor assembly is rotatable about a first axis. A centerline of the motor assembly is aligned with the first axis.

The main rotor of the helicopter requires power to drive it to rotate. The rotating rotor blades cause the air with normal pressure to move rapidly below the rotor. It is generally referred to as "downwash velocity", "downwash of the rotor", or "increased pressure". The increased pressure below the rotor creates an upward lift. The power absorbed by a rotor to produce lift is made up of two components:

1. The power used to increase the momentum of the air in the vertical direction: Lift $HP_1$ (first portion of the driving power for increasing vertical air momentum)

$$U=\sqrt{L/2A\rho} \qquad (1)$$

where U is the induced vertical velocity of the air in ft/sec,
L is the lift in lb.
A is the swept area of the rotor in $ft^2$, and
$\rho$ is the density of air.
Therefore, from equation (1), $HP1=L\times U/550$.

2. The power to rotate the rotor against the drag: The profile drag $HP_2$ (second portion of the driving power).

The power to drive the rotation of a helicopter rotor is in two forms:
A) For a conventional helicopter, the kinetic energy of the rotary output of an internal combustion engine or a turboshaft engine and a high-energy motor is transmitted from the main shaft to the rotor hub through a clutch, a reduction gearbox, and an overrunning clutch so as to rotate the rotor blades.
B) Power from the ramjet mounted on the outer end of the rotor, an engine, a turbojet, or a hydrogen peroxide jet is injected from the tip of the rotor to generate thrust to drive the main rotor blades to rotate.

In order to safely apply the necessary functions of the autorotation in the event of an engine failure, the helicopter must include a design with an optimal autorotation rotor system. For helicopters in production today, the high energy rotor systems provide the pilots of the helicopters with optimal autorotation functions.

Only the French DJINN helicopter meets higher autorotation criteria. Other co-axial power-driven helicopters having two-layer rotors rotating relative to each other, having no torque acting on the fuselage, and not integrating with tail rotor and tail drive systems, experience the complexity of the engine transmission system and the rotor hub control system. The reduction of the autorotation drop efficiency is caused by the aerodynamic interference of the upper and lower rotors and the coaxial up-and-down counter-rotation rotor. The efficiency is increased in climbing and hovering. It is in the opposite under the condition of autorotation landing. Thus, the performance is not as good as a single-blade traditional helicopter autorotation safe landing. Therefore, for safety reason, it is critical to use a large diameter main rotor having a small disk load per square foot (for example, 1.5 lb/ft²) to achieve optimal aerodynamic design. The selection above includes consideration of: trade studies of the main rotor geometry being made for solidity, tip speed, diameter, airfoil, chord and twist. In this way, large diameter for freely rotating and small weight are keys to meet safe autorotation landing requirements.

In one example of a prototype of the present disclosure, the (empty) fuselage structure weighs 254 pounds. The additional second battery pack weighs 30 pounds. The pilot weighs 220 pounds. The helicopter gross weight is 504 pounds (230 kg). The helicopter has an 18.5-ft diameter dimension with a 5.6-inch chord rotor, operating at 550 feet per second tip speed. Each blade weights 11 lbs. of which 1 lb. is distributed at the tip to produce a high inertia rotor for efficient autorotation. It results in a disc loading of 1.5 lb/ft², with a requirement of 32 horsepower to hover in a 2,000 ft and 70° F. environment.

The electric propeller will be used to directly drive the main rotor of the helicopter through the torque arm assembly. The torque equation is:

$$T_R = h_r p_r \times 550/2\pi) \times N \quad (2)$$

where $T_R$ is the main rotor torque in lbs-ft, and
N is rotor speed in revolutions per second.

While the rotor is rotating at 8.3 revolutions per second, the torque is 311 lb.-ft (43 kg-m; 420-NM). The calculated results show that a torque arm of approximate one meter in length (0.9 meter to 1.1 meter) is sufficient to generate a torque of 43 kg-m for the main rotor assembly.

The driving power is reduced from 32 hp to 16 hp. The efficiency is doubled. The fly time limit of the electric helicopter will be more than one hour. It is a manned helicopter with safely autorotation landing capability. It meets the requirement of FAA FAR Part-103.

The advantages of using an electric propeller torque arm as the power to drive the main rotor include:
1. The driving efficiency is increased by 35% because of direct driving and without tail rotor system and main drive train.
2. The helicopter's mechanical structure has been simplified by 40%.
3. It is easier to hover especially in a cross-wind condition.
4. It provides static longitudinal stability at all air speeds.
5. The rotor operates at lower angles of attack, that is, the angle at which the blade stalls are far removed from the normal flight blade angle. This allows a wide margin of safety.
6. VTOL (vertical takeoff and landing) operations at high altitudes and high temperatures are possible.
7. Rotor speed is not critical because the present disclosure allows operation over a wide range of RPM with an overspeed capability as much as 30% over the recommended RPM.
8. The ability to accelerate forward and climb simultaneously in a smooth and powerful manner is improved.
9. Slower power-off descents using the inertia stored in the main rotor and torque arm for safe autorotation landings are possible.
10. Gyroscopic stabilization due to the massive main rotor plus torque arm is improved.

DETAILED DESCRIPTION

Figure 1:
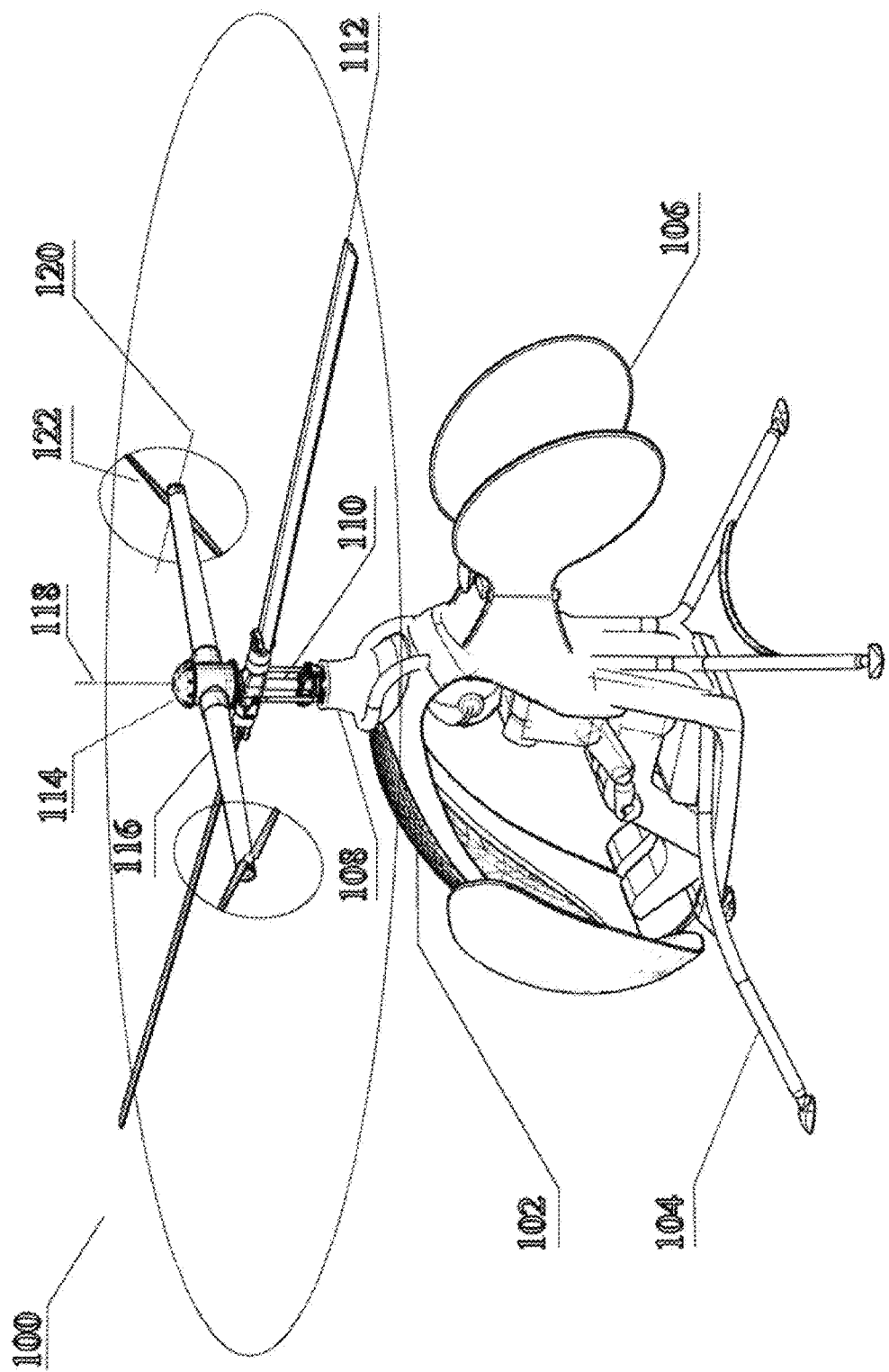
FIG. 1 is a helicopter in examples of the present disclosure.

FIG. 1 is a helicopter 100 according to various embodiments of the present disclosure. It should be noted that the helicopter may be a manned helicopter, an unmanned helicopter, or a multiple-rotor drone. The helicopter 100 comprises a fuselage 102, a landing gear assembly 104, a tail assembly including a directional control rudder 106, a control system assembly 108, a main shaft assembly 110, a main rotor blade 112, a motor assembly 114 and a torque arm assembly 116. In examples of the present disclosure, the landing gear assembly 104 is directly attached to a bottom portion of the fuselage 106. The directional control rudder of the tail assembly 106 is directly attached to a back portion of the fuselage 102. The control system assembly 108 is attached to the fuselage 102. The main shaft assembly 110 is attached to the control system assembly 108. The main rotor blade 112 is attached to the main shaft assembly 110. The torque arm assembly 116 is attached to the main shaft assembly 110. The rotor blade 112 may be positioned between the fuselage 102 and the torque arm assembly 116 on the main rotational axis 118. In various embodiments of the present disclosure, the motor assembly 114 is centered on the main rotational axis 118. The motor assembly 114 may include multiple motors, each of whose drive shafts has a centerline coaxial with or parallel to the main rotational axis 118. Similarly, the torque arm assembly 116 is centered on and is coaxial with the main rotational axis 118.

In examples of the present disclosure, the rotor blade 112 is rotatable about the main rotational axis 118. A centerline of the motor assembly 114 is aligned with the main rotational axis 118. The motor assembly 114 drives the torque arm assembly 116. It will be noted that the torque arm assembly is a powered torque arm, but for brevity of expression, the powered torque arm assembly will be referred to herein as a torque arm or torque arm assembly. In embodiments of the present disclosure, the torque arm assembly 116 may comprise multiple torque arms (see FIG. 4). Each torque arm of the torque assembly 116 comprises a torque arm propeller 122. The torque arm propeller 122 is rotatable about the propeller axis 120. The propeller axis 120 is perpendicular to the main rotational axis 118. In examples of the present disclosure, each torque arm of the torque arm assembly 116 is about one meter in length. The length of each torque arm of the torque arm assembly 116 is in the range from 0.9 meter to 1.1 meter.

In various embodiments of the present disclosure, a plurality of motors is included in the motor assembly 114. Each motor drives a corresponding torque arm propeller 122 through a bevel gear set 406 and a drive shaft 410 (see FIG. 4). The propeller is powered by electric power transmitted from a center of the main shaft assembly 110. The main rotor blade 112 generates push-pull force. Therefore, the rotor blade 112 rotates with an energy in the order of kilogrammeters. The torque arm propeller 122 generates torque and pulls a tip of a torque arm of the torque arm assembly 116 so that the torque arm assembly 116 rotates either clockwise or counterclockwise.

Figure 6:
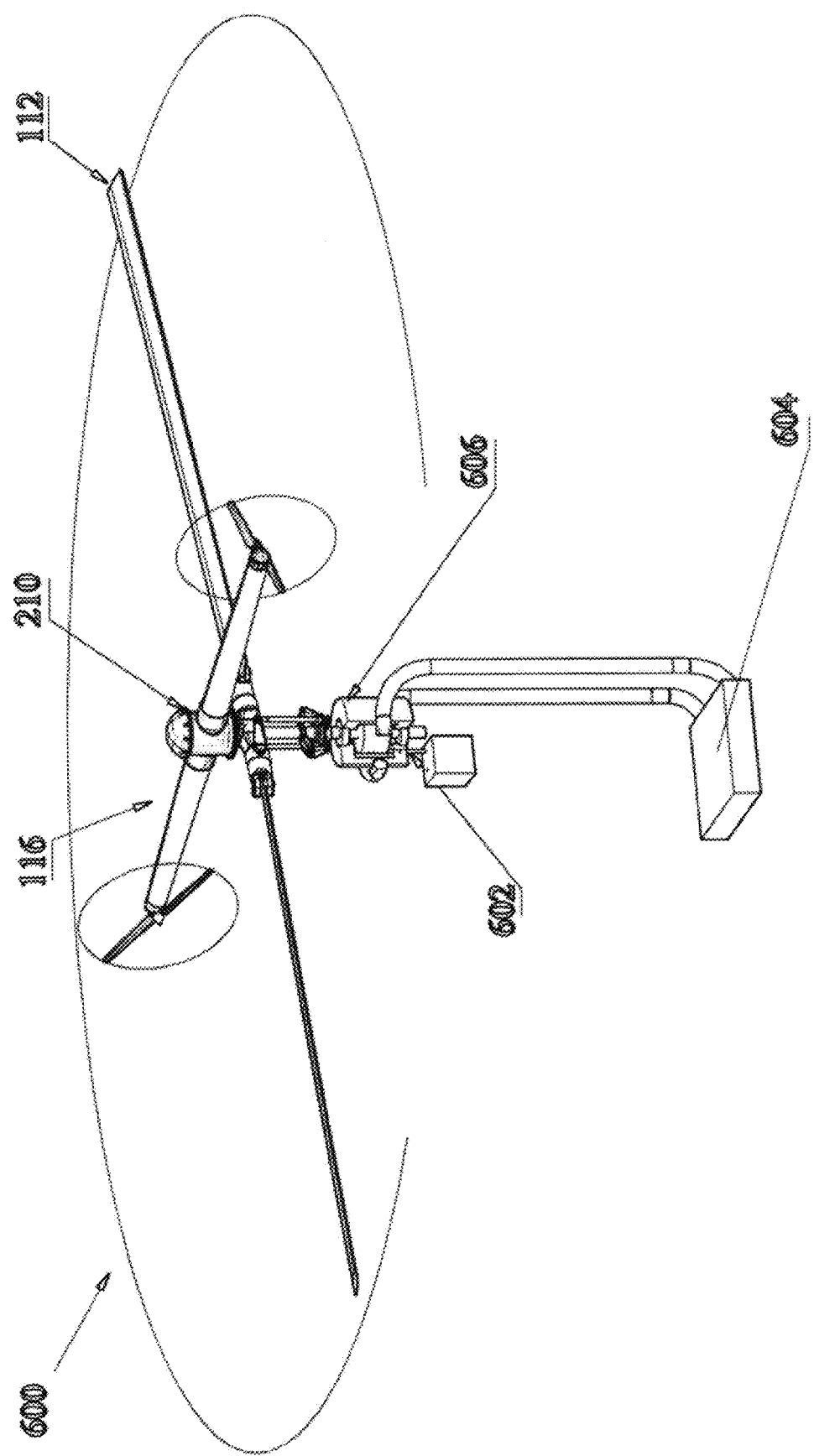
FIG. 6 illustrates the drive control mechanism and power supply components.

In examples of the present disclosure, the motor assembly 114 is powered by a battery (shown in FIG. 6). In examples of the present disclosure, the helicopter 100 excludes an engine and excludes a mechanical transmission system on the fuselage 102. In examples of the present disclosure, the directional control rudder 106 excludes a tail boom and excludes a tail rotor system balancing torque.

Figure 2:
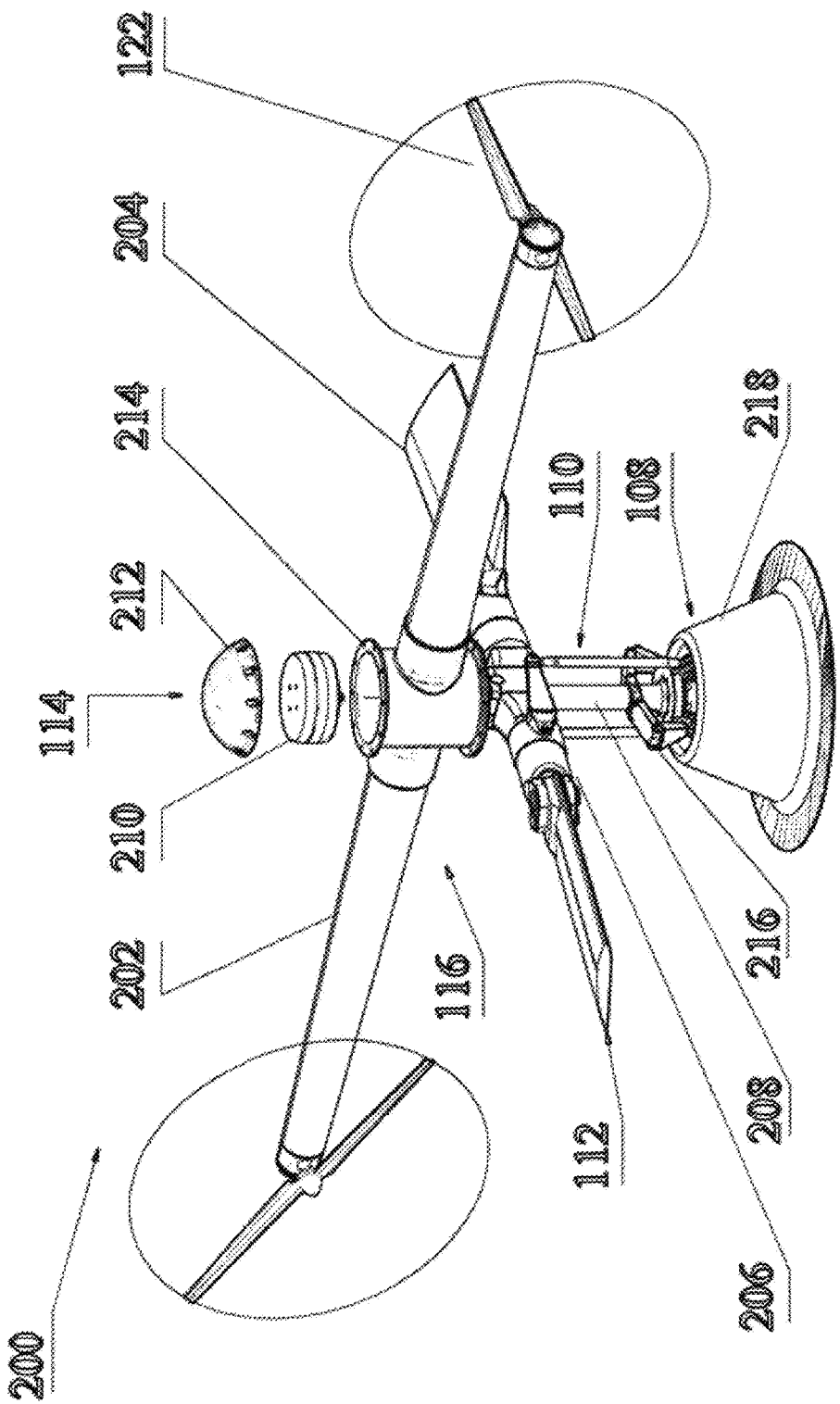
FIG. 2 is an exploded view of a driving assembly including a torque arm assembly and a main rotor assembly of a helicopter.

FIG. 2 is an exploded view of a driving assembly 200 of a helicopter according to the present disclosure. The driving assembly 200 comprises the control system assembly 108, the main shaft assembly 110, the rotor blade 112, at least one motor assembly 114, and at least one torque arm assembly 116.

Each torque arm of the plurality of torque arms in the torque arm assembly 116 includes a torque arm tube 202 and a torque arm propeller 122. The torque arm tube 202 is preferably made of a lightweight, high-strength carbon fiber material. The length (radius) of each torque arm of the torque arm assembly 116 is in a range from 0.9 meter to 1.1 meter so as to generate sufficient lifting force without adding significant weight. The torque arm propeller 122 is preferably a large-pitch, high-speed propeller. Each torque arm propeller 122 is mounted on a distal end (tip) of the torque arm.

The main rotor assembly 112 includes a rotor blade 204 and a rotor hub 206. The main shaft assembly 110 includes a shaft 208. The motor assembly 114 includes at least one high-energy direct-current (DC) motor 210, a motor cover 212 and a motor housing 214. In examples of the present disclosure, the high-energy DC motors 210 are mounted coaxially with the main shaft assembly 110. A diameter of a bottom portion of the motor cover 212 is approximately equal to the diameter of a top portion of the motor housing 214. As mentioned above, multiple sets of torque arms may be installed on the main rotational axis 118.

A motor speed controller can be installed in the motor housing 214. The motor housing 214 is preferably made of an aluminum alloy material and then processed by a computer numerical control (CNC) machining. In examples of the present disclosure, the motor housing 214 is formed by a welding process followed by CNC machining.

The control system assembly 108 includes a swashplate system assembly 216 and a control system housing 218. The swashplate assembly 216 of the control system assembly 108 includes swashplate control servos, collective pitch control servos and electronic control system.

Figure 3:
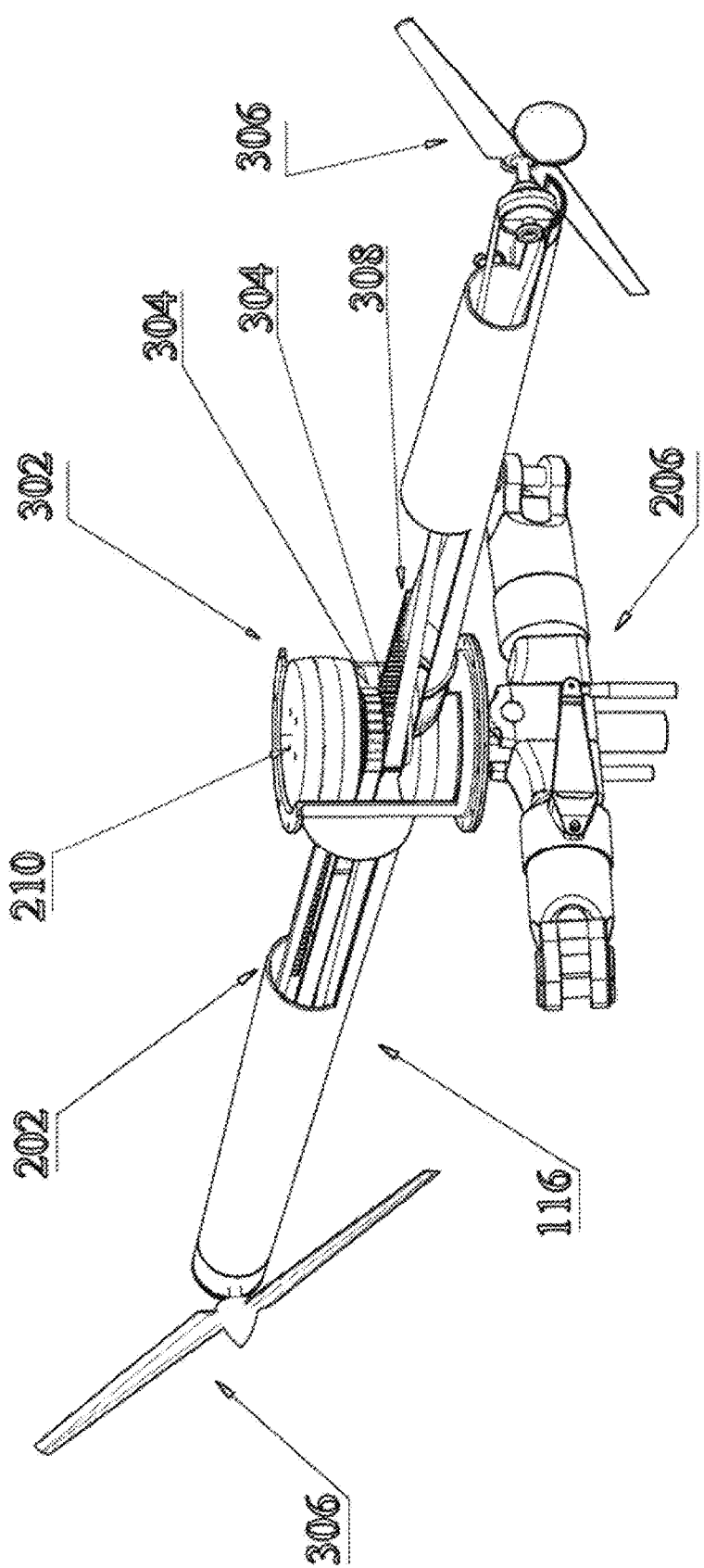
FIG. 3 is a cutaway view of a torque arm assembly showing the drive mechanism.

FIG. 3 is an exploded view of a torque arm assembly 116 mounted on the main rotational axis along with the rotor blade 112 and at least one motor 210. The motor 210 is encased in a motor housing 302. The torque arm assembly 116 includes a torque arm tube 202 and a timing pulley 304. The timing pulley 304 is a synchronous timing pulley mounted on the output shaft of the high-energy motor 210. A timing pulley 304 is required for each torque arm propeller 306 utilized in a given embodiment. Each timing pulley 304 is mounted on an output shaft of the motor 210 which is coaxial with the main rotational axis 118. A timing belt 308 connects the timing pulley 304 to a torque arm propeller 306. The timing belt 308 is a high-intensity synchronous timing belt. In various embodiments, the timing belt 308 has a span distance (center distance) of about one meter. The motor 210 drives the torque arm propeller 306 via the timing pulley 304 and the timing belt 308. The rotor blade 112 is mounted coaxially with the motors 210.

Figure 4:
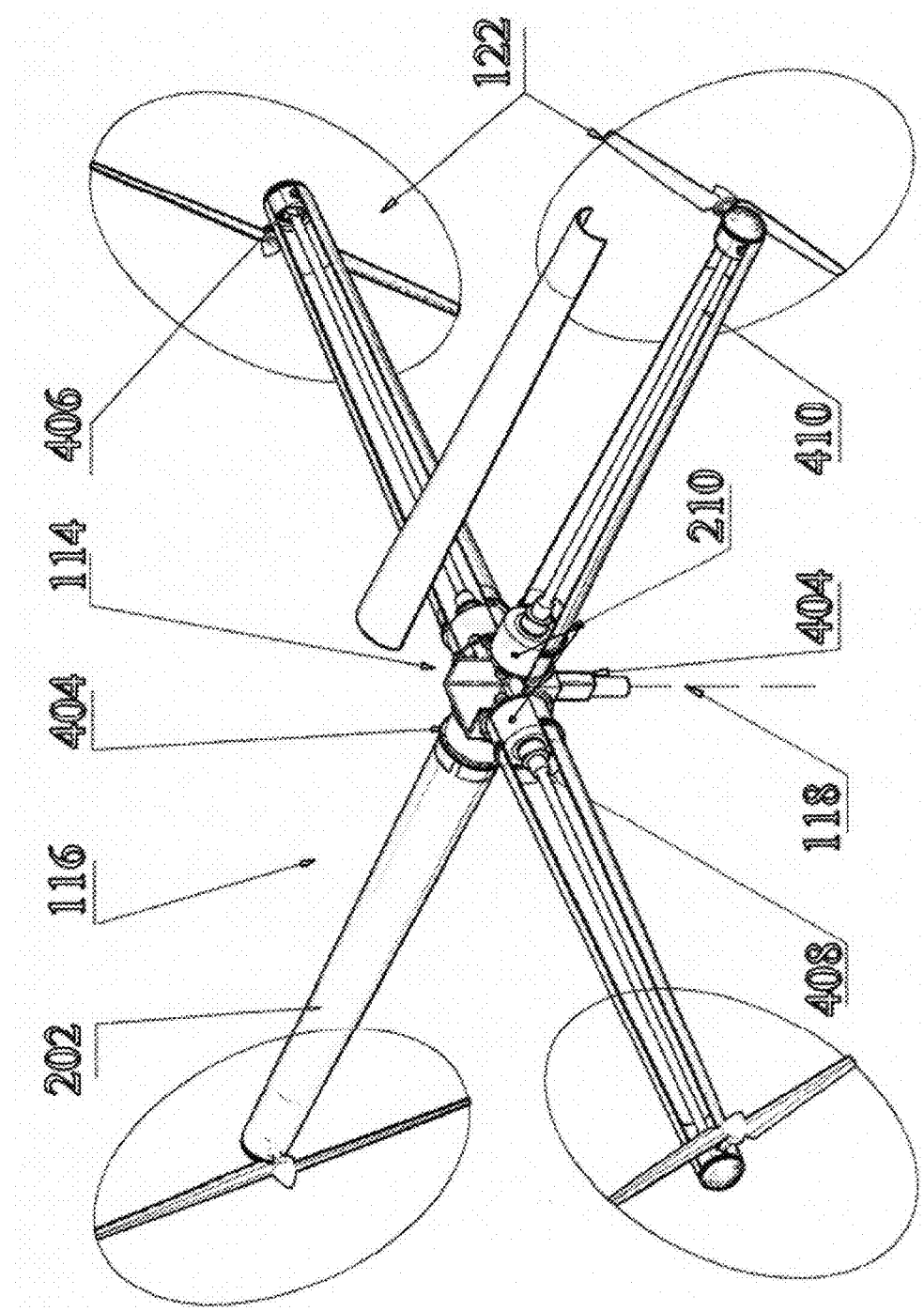
FIG. 4 is a cutaway view of a torque arm assembly.

FIG. 4 is a cutaway of the torque arm assembly 116. In exemplary embodiments, the torque arm assembly 116 has four torque arms and a coupling joint 404. Each torque arm of the torque arm assembly 116 includes a torque arm tube 202, the coupling joint 404, a motor housing 14, a bevel gear set 406, a flexible coupling 408, a plurality of high-energy motors 210, and a drive shaft 410. The bevel gear set 406 connects the drive shaft 410 to the torque arm propeller 122. The torque arm propeller 122 is driven by the drive shaft 410 through the bevel gear set 406. The coupling joint 404 may be made of an aluminum alloy material. The coupling joint 404 connects the torque arm tube 202 to the motor assembly 114. The motor housing 214 of the central motor assembly 114 may be made of an aluminum material and is processed by CNC machining. The bevel gear set 406 contains right-angle bevel gears. The drive shaft 410 may be made of a carbon fiber material. In examples of the present disclosure, a first distance between the main rotational axis 118 and the respective center of each motor 210 is at least fifteen times smaller than a second distance between the axis 118 and a respective center of each torque arm propeller 122 of the plurality of torque arms of the torque arm assembly 116.

Figure 5:
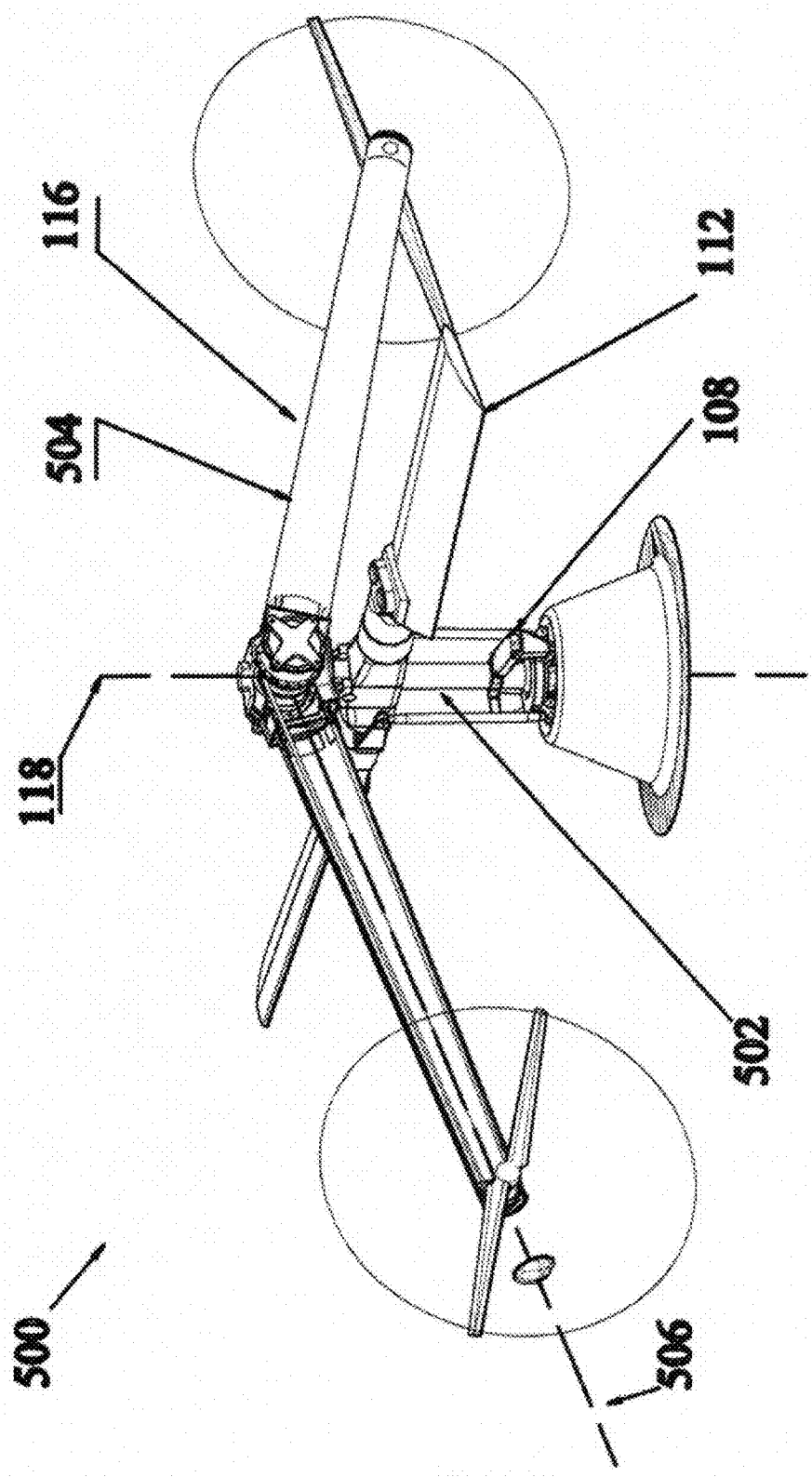
FIG. 5 shows the driving mechanism of the torque arm assembly and propeller.

FIG. 5 shows the drive assembly 500 of a helicopter in examples of the present disclosure. The drive assembly 500 comprises a control system assembly 108, a main shaft assembly 502, a rotor blade 112, and a torque arm assembly 116. Each torque arm 504 of the torque arm assembly 116 has a droop angle (illustrated in FIG. 7). Each centerline 506 of a corresponding torque arm 504 of the plurality of torque arms of the torque arm assembly 116 forms a droop angle with respect to the main rotational axis 118. The advantage is to reduce the interference of the component force of the torque arm 504 asserted on the rotor blade 112. This lowers the center of gravity of the torque arm assembly 116, thus improving the stability of the rotation of the rotor blade 112.

The main rotor blade 112 of the helicopter is driven by the power transmitted via the main shaft assembly 502. The power unit must be driven by the main shaft so that the fuselage has no reaction torque. The power unit has a weight of at least a few kilograms per horsepower. According to the theoretical formula of centrifugal force:

$$F = W/g \times (\text{Angular Velocity in Radians/Sec.})^2 \times K_R (\text{Radius of } CG)$$

where F is the centrifugal force in lbs.;
W is weight in lbs.;
g is acceleration due to gravity (32.2 ft/sec/sec); and
$K_R$ is radius of gyration in ft.

The weight W of a motor with a large horsepower is in the order of several pounds. If the motor is installed in the middle or tip of the main rotor assembly, the radius R will be a dozen feet. From W multiplied by R and multiplied by the square of the angular velocity, the value of the centrifugal force will exceed several thousand pounds (in the order of tons).

An important aspect of the present invention is that the motor W is fixed at the center of the rotating shaft so that the radius R is zero (or almost zero). The centrifugal force generated by the very heavy motor is zero (or almost zero). This makes the power system of the present disclosure practical for manned light-weight helicopter applications.

The electric propeller drives the torque arm of the main rotor. The centrifugal force of the torque arm system has three portions:

The first is to drive the motor. Since its output shaft is coaxial with the rotation axis of the main rotor, R is zero, so the centrifugal force of this portion is zero (or almost zero), and can be neglected.

The second is the torque arm and the weight W of the synchronous timing belt or driving shaft. Radius R is measured from the center of the rotary mass. The torque arm tube is made of carbon fiber composite and may weigh about 800 grams. The synchronous toothed belt with a center distance of one meter has a weight of 112 grams. Radius $K_R$ of gyration is calculated. This is the point where all the weight of a single rotor blade can be considered to act for the purposes of calculating the centrifugal force. The radius of gyration is determined by considering all the weight is concentrated at the point used to calculate the centrifugal force. The radius of gyration of a flat section rotating about one end:

$$K_R^2 = R^2/3 \qquad (4)$$

The third is the centrifugal force generated by pushing and pulling the propeller and the small transmission timing pulley or the bevel gear set with the weight W (About 200 grams) with radius R. On the torque arm, the determination of the position of radius R of the driving propeller depends on two major factors: Firstly, the rotation speed of the concentration point is suitable for pushing and pulling the working requirements of the propeller, and with suitable speed and pitch of the propeller. Power is adapted to drive the blade of main rotor and meets the requirement of the tip speed. Secondly, if the distance from the center of rotation R is too large, the transmission requirements are increased, the weight is increased, and the centrifugal force is increased.

The conclusion of the test is that R=1.0 m is a suitable radius. The torque is in kg-meter or newton-meter. The rotational speed at this radius is approximately 200 km/h (50 m/s). It is the suitable working range for the push-pull propeller. The top of the main rotor hub of the helicopter is connected to a coupling joint aligned with the helicopter main shaft, for driving the rotation of the helicopter main shaft. The main shaft of the helicopter is a conventional hollow, tubular shaft. The 48V-60V DC power transmission line that drives the DC motor passes through the center of the main shaft. The speed control signal of the power DC motor is transmitted from the center of the main shaft to the torque arm. The high-energy DC motors 210 may be high-power brushless motors having an output shaft aligned with the centerline of the main rotor of the helicopter.

Referring now to FIG. 6, the power supply assembly 600 includes a control module 602 of the motor is mounted in communication with a slip ring 606. The control module 602 controls the supply of power from a battery pack 604 to the motor or motors 210. The battery pack 604 is typically located under the pilot's seat.

Figure 7:
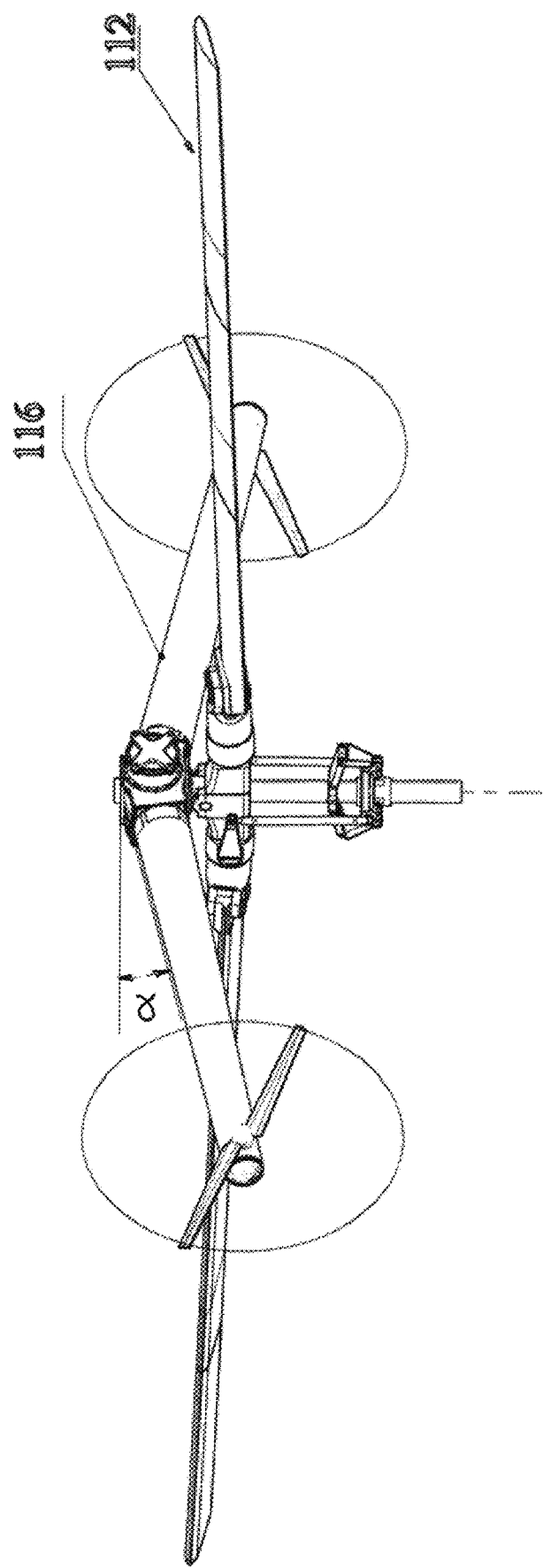
FIG. 7 depicts a torque arm assembly with a droop angle.

In order not to cause the driving force of the torque arm mounted on the main rotor hub to be higher than the rotation plane of the main rotor, the torque arm 20 hangs down and has a droop angle alpha as illustrated in FIG. 7. The droop angle allows the center of gravity of the torque arm assembly to be lowered, thereby increasing the stability of the rotating rotor blade 112.

In one example of the present disclosure, the helicopter rotor blade 112 has a diameter of 18.5 feet. The rotor solidity is reduced to 0.03. The chord rotor is 5.6 inches. The main rotor hub is a 2-bladed underslung teetering system. The swashplate and the collective pitch control are controlled by electronic numerical control servos. It is easier for the pilots of the helicopters to switch to automatic driving systems for autonomous flight and to safely land in an autorotation mode. This torque-arm-driven electric single-person helicopter test prototype is produced in accordance with the requirements of FAA-FAR Part 103. The empty weight of the helicopter is less than 254 lb. (115 kg). The fuselage 620 and the landing gears 27 are made of light-weight, carbon fiber or aluminum alloy composite material. The weight of the main rotor assembly 112, the rotor hub 7, swashplate system assembly 9, control steering gear and bracket suspension is about 50 pounds. The weight of fuselage and the landing gear is 66 pounds. The weight of the drive torque arm assembly is no more than 22 pounds. LiPo's first battery pack is 96 pounds. The remaining accessories are 20 pounds. The sum is 254 pounds.

In accordance with FAR Part 103 with 220 pounds limitation for the occupant or pilot, there is a load of 5 gallons of fuel. It will be replaced by a second battery pack and weighs 36 pounds. The total weight of the onboard battery of the first and second battery packs is A 132-pound (60 kg) lithium polymer battery. Total of 10 KW×h. It will have a flying time of more than one hour. The total weight of the test helicopter is 510 pounds (232 kg). The battery pack is under the pilot seat 25. The 48V-60V DC will be transmitted through the hollow spindle to the top torque arm to operate the motor in the center of the torque arm. A synchronous timing belt or driving shaft drives the large-pitch high-speed propeller at the outer end of the torque arm to push and pull the helicopter's main shaft to drive the main rotor to rotate. It is similar to the "Volga River trackers".

The torque arm assembly drives the main rotor blade of the helicopter. The larger the radius of the torque arm, the greater the torque and the greater the centrifugal force. The speed at which the propeller is driven is increased, and the rotational resistance is also increased. In one example, the present disclosure uses calculation and manufacturing techniques to reduce the drag resistance of the torque arm by determining an optimal value of the torque arm radius. The helicopter of the present disclosure significantly reduces power consumption of the power-driven mode of the conventional structure of the helicopter by eliminating fuel supply for rotating internal combustion engines or turboshaft engines, by reducing the numbers of gears or belt, and by eliminating the tail rotor. The complexity and weight of the structure is reduced by nearly 40%. It allows the electric helicopter with battery capacity to increase the flight time by increasing the carrying capacity of the battery pack. At the same time, the driving efficiency of the torque arm is higher than that of the shaft drive. The increase of the driving efficiency also allows the battery pack to last longer. Conventionally, it has been tested on small helicopter models to fix the motor directly to the tip of a crossbar (for example, U.S. Pat. No. 5,934,873 to Greene), but it is not suitable for larger payload manned helicopters because of the huge centrifugal force resulting in difficulty of helicopter control and operation. The present disclosure discloses that the driving motor is arranged coaxially with the main rotor so that the centrifugal force of the driving motor is zero (or almost zero). This driving method can be applied to a manned helicopter.

Figure 8:
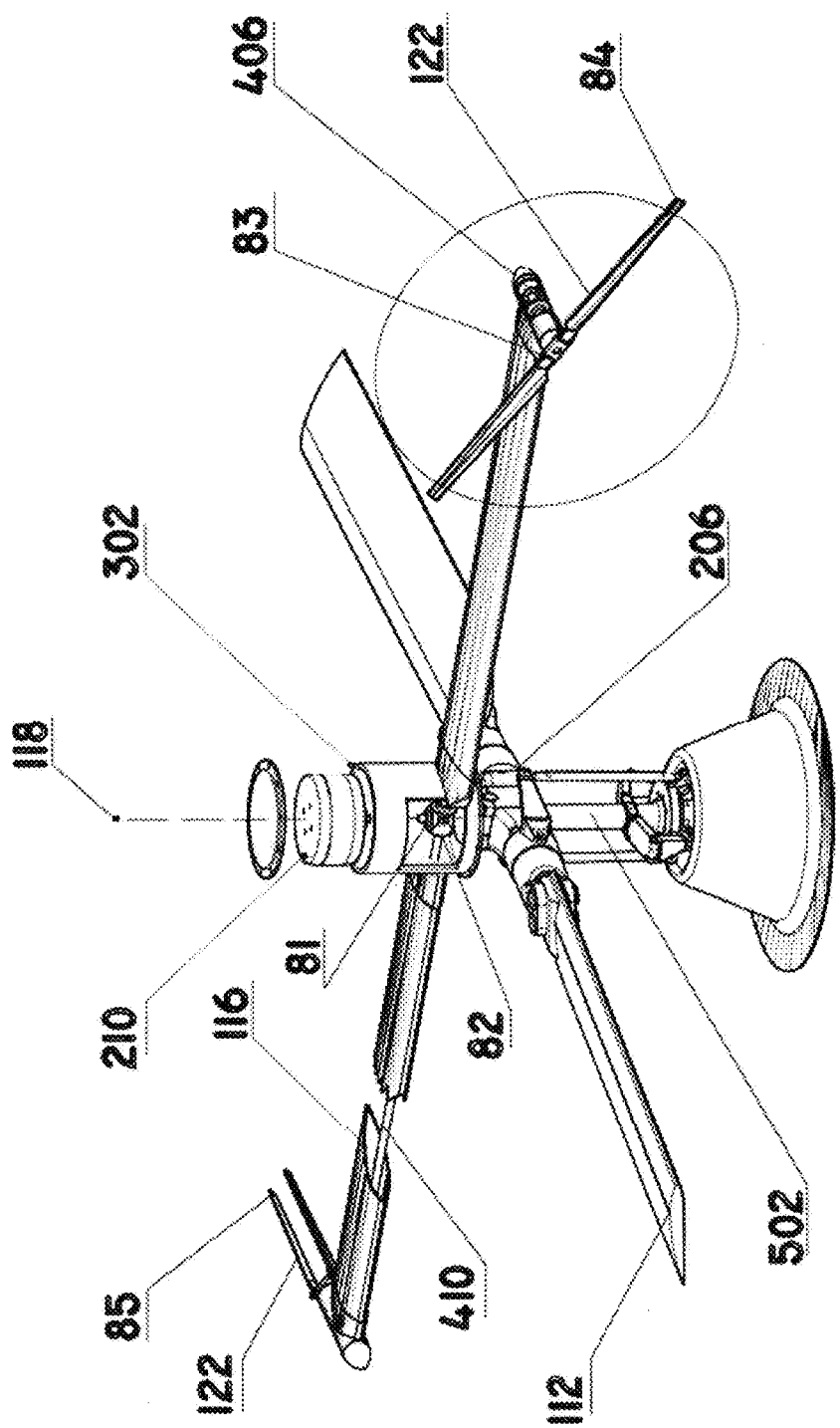
FIG. 8 illustrates the hinging mechanism of the torque arm propeller used in the autorotation function.

FIG. 8 shows an assembly according to the present disclosure with an important safety feature added. The torque arm 116 is driven by a first bevel gear 81 on the main rotational axis 118 which mates with a translating bevel gear 82 affixed to the drive shaft 410. Another set of bevel gears 406 transmits power to the torque arm propeller 122.

The cross-sectional profile of the torque arm 116 is equivalent to that of an airfoil of an aircraft wing. A suitable choice for the airfoil is that of NACA 63-3-018. The torque arm 116 has a titanium alloy drive shaft 410, and constitutes a carbon fiber reinforced rigid torque arm 116 constructed with a symmetrical airfoil.

If the drive motor 210 stops or the power system fails, an autorotation function is initiated so that the pilot can control the helicopter in order to safely land. In the event the helicopter loses power, the drag of the torque arm 116 needs to be minimized to allow the pilot to control the helicopter. Therefore, each blade of each torque arm propeller 122 includes a hinge 83 that allows the propeller 122 to be folded in order to reduce the rotation resistance. Under normal operating conditions, as power is applied to the torque arm 116, the torque arm 116 rotates, and the propeller 122 is moved to the open position 84 by centrifugal force.

When the autorotation function is initiated due to a loss of power in the helicopter, the propeller 122 rotates from the open position 84 to the closed position 85. When power is lost, head-on drag urges the propeller 122 toward the closed position. The propeller 122 may also be spring loaded, the tension of the spring urging the propeller 122 toward the closed position 85. With reduced rotation drag, the main rotor blades will speed up, allowing the helicopter to land safely in autorotation mode.

The airfoil section of the torque arm 116 has a good lift-drag ratio. When the pitch angle between the torque arm 116 and the plane of rotation is 1°, and the helicopter is landing while flying forward at a speed of approximately 50 knots, the helicopter's and the torque arm's lift-drag vector can be divided into two components, one acting vertically to overcome weight (gravity), and the other acting horizontally to pull forward on the torque arm.

Those of ordinary skill in the art will recognize that modifications of the embodiments disclosed herein are possible. For example, a total number of torque arms may vary. Other modifications may occur to those of ordinary skill in this art, and all such modifications are deemed to fall within the purview of the present invention, as defined by the appended claims.

What is claimed is:

1. A helicopter comprising:
   a torque arm assembly rotatable about a main rotational axis, the torque arm assembly comprising a plurality of torque arms, each of the torque arms comprising a torque arm propeller, a timing pulley, and a timing belt that connects the timing pulley to the torque arm propeller, such that the motor assembly drives the torque arm propellers via the timing pulley and the timing belt;
   a main rotor blade mounted coaxially with the torque arm assembly and rotatable about the main rotational axis;
   a motor assembly mounted coaxially with the torque arm assembly and outside a fuselage of the helicopter, the torque arm assembly being rotatable about the main rotational axis;
   a main shaft assembly; and
   a battery pack, power from the battery pack being transmitted through a slip ring to the motor assembly via a center channel in the main shaft assembly;
   wherein
   the motor assembly drives the torque arm propellers, and torque generated by the torque arm propellers rotates the torque arm assembly and the main rotor blade about the main rotational axis; and
   at least one of the torque arm propellers is hinged so that it can move between a first closed position and a second open position.

2. The helicopter of claim 1, wherein a centerline of each torque arm of the torque arm assembly is in a plane perpendicular to the main rotational axis.

3. The helicopter of claim 1, wherein the motor assembly comprises a plurality of motors and wherein a centerline of each of the plurality of motors is coaxial with the main rotational axis.

4. The helicopter of claim 1 further comprising a control module, the control module generating control signals that are transmitted through the slip ring to the motor assembly.

5. The helicopter of claim 1, wherein the helicopter is a manned helicopter, an unmanned helicopter, or a multiple-rotor drone.

6. An apparatus comprising:
   a torque arm assembly rotatable about a main rotational axis, the torque arm assembly comprising a plurality of torque arms, each of the torque arms comprising a torque arm propeller, a timing pulley, and a timing belt that connects the timing pulley to the torque arm propeller, such that the motor assembly drives the torque arm propellers via the timing pulley and the timing belt;
   a main rotor blade mounted coaxially with the torque arm assembly and rotatable about the main rotational axis;
   a motor assembly mounted coaxially with the torque arm assembly and outside a fuselage of the helicopter, the torque arm assembly being rotatable about the main rotational axis, the motor assembly comprising a plurality of motors, a centerline of a drive shaft of each of the plurality of motors being parallel to the main rotational axis;
   a main shaft assembly; and
   a battery pack, power from the battery pack being transmitted through a slip ring to the motor assembly via a center channel in the main shaft assembly;

wherein
the motor assembly drives the torque arm propellers, and torque generated by the torque arm propellers rotates the torque arm assembly and the main rotor blade about the main rotational axis; and
at least one of the torque arm propellers is hinged so that it can move between a first closed position and a second open position.

7. The apparatus of claim 6, wherein a centerline of each torque arm of the torque arm assembly is in a plane perpendicular to the main rotational axis.

8. The apparatus of claim 6, wherein the motor assembly comprises a plurality of motors and wherein a centerline of each of the plurality of motors is coaxial with the main rotational axis.

9. The helicopter of claim 6, further comprising a control module, the control module generating control signals that are transmitted through the slip ring to the motor assembly.

\* \* \* \* \*